Patented July 22, 1924.

UNITED STATES PATENT OFFICE.

ARTHUR J. KNOWLES, OF WILMINGTON, DELAWARE.

COMPOUND FOR BRAZING AND WELDING.

No Drawing.    Application filed January 3, 1923. Serial No. 610,517.

*To all whom it may concern:*

Be it known that I, ARTHUR J. KNOWLES, a citizen of the United States, residing in Wilmington, in the county of New Castle, State of Delaware, have invented certain new and useful Improvements in Compounds for Brazing and Welding, of which the following is a full and complete specification.

In the operation of brazing and welding metals, it is necessary to bring the contacting parts to an elevated temperature sufficient to accomplish the softening to the degree which will permit a ready union of the parts. It has long been known that when sufficient heat is applied to the metal parts being brazed or welded that any impurities of the metal will be localized upon the surfaces and impede or resist the successful union at the contact surfaces. The presence of such impurities is evident as oxides and in the abnormal hard or glassy formations which weaken the weld and hinder the filing, machining or other subsequent treatment of the brazed or welded parts. While numerous attempts have been made to provide a flux or other compound which will clean the contacting surfaces prior to brazing or welding, these compounds are limited generally to substances which will take up the impurities but without removing them from the contact surfaces. This invention has for an object the provision of a compound to be used as a flux in brazing and welding marked by its ability not only to clean the surfaces forming the union of the parts but also to prevent the localization on such surfaces of impurities and in fact to remove from the surface any impurities which may be brought there during the heating operation. This is accomplished by providing a flux capable of penetrating the surface of the material in advance of the brazing or welding thus leaving the material at the contacting surfaces in clean and readily adherent condition.

Other objects of my invention include a fluxing compound, the use of which accomplishes a weld or braze free from abnormal alloy formations which would otherwise interfere with the strength of the weld and the subsequent treatment of the material.

A compound which is found to have the above properties is formed by the preparation of the various ingredients hereinafter described. A mixture containing the following amounts by weight:

| Cochineal | 2 |
|---|---|
| Calcium hydroxide | 1½ |
| Alumina | 1½ |
| Potassium chlorate | 14 |
| Aluminum | 1 | is triturated or finely ground in the dry state. Twenty parts of this mixture are used in compounding the final product.

A second mixture of ingredients taken in the proportion indicated by weight of:

| Potassium perchlorate | 10 |
|---|---|
| Borax | 58 |
| Potassium chlorate | 12 |
| Water | 28 | is intimately blended and dried in a furnace following which the mixture is ground.

Eighty parts of this mixture are combined with twenty parts of the mixture first above described to form the compound for brazing and welding. This compound is well blended and is then ready for storage or use.

The compound of substantially the above composition and character is economical and easy of manufacture, keeps well, and is readily used by brazers and welders of ordinary experience.

As above described, brazed joints and welded parts are produced by the use of this compound as a flux in a manner extremely advantageous by reason of the effective cleaning of the contact surfaces and the prevention of any formation of abnormal alloy spots which might weaken the braze or weld and be hard to file or machine. It is believed that this result is obtained by an action of this compound in penetrating the heated surfaces, dissolving the undesirable impurities and carrying them back into the metal together with the brazing or welding metal. This produces a uniform braze or weld which penetrates for a considerable distance back of the contacting surfaces and widens materially the zone or area of union with consequent strengthening of the joint.

This compound is effective in the brazing of iron of cast, chilled or malleable varieties, steel of all grades and for copper, other metals, brass or other industrial alloys. In like manner effective welds can be made in all forms of iron, steel, aluminum, copper, bronz and similar alloys.

The compound above described may, with reasonable limits, be varied in minor details of proportions or by the substitution of analogous ingredients without departing from the scope of my invention as claimed hereinafter.

What I claim is:

1. A compound of the character described containing calcium hydroxide, alumina, aluminum, borax and potassium chlorate.

2. A compound of the character described containing calcium hydroxide, alumina, aluminum, borax, and potassium chlorate and potassium perchlorate.

3. A compound of the character described containing cochineal 2%; calcium hydroxide 1½%; alumina 1½%; aluminum 1%; potassium chlorate 26%; borax 58% and potassium perchlorate 10%.

In testimony whereof, I have hereunto affixed my signature.

ARTHUR J. KNOWLES.